(No Model.)

J. MASSETT.
EXPANDING MANDREL.

No. 389,480. Patented Sept. 11, 1888.

WITNESSES
Villette Anderson.
C. R. Ferguson.

INVENTOR
John Massett,
by E. W. Anderson
Attorney

UNITED STATES PATENT OFFICE.

JOHN MASSETT, OF NORTH TARRYTOWN, NEW YORK.

EXPANDING MANDREL.

SPECIFICATION forming part of Letters Patent No. 389,480, dated September 11, 1888.

Application filed June 19, 1888. Serial No. 277,561. (No model.)

*To all whom it may concern:*

Be it known that I, JOHN MASSETT, a citizen of the United States, and a resident of North Tarrytown, in the county of Westchester and State of New York, have invented certain new and useful Improvements in Expanding Mandrels; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
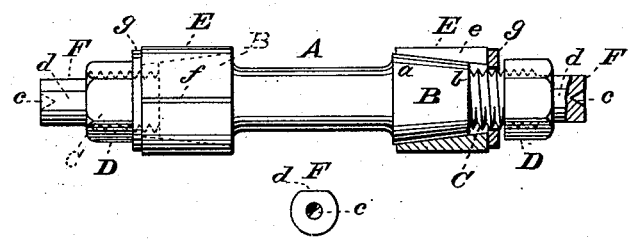
Figure 2:
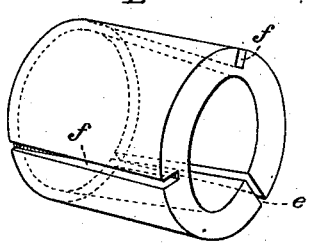
Figure 3:
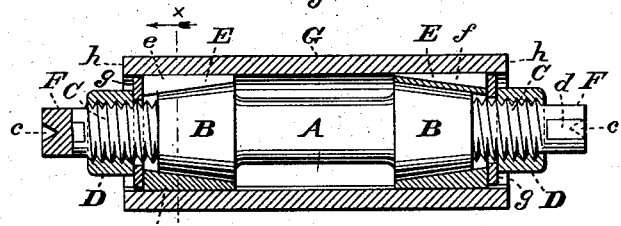
Figure 4:
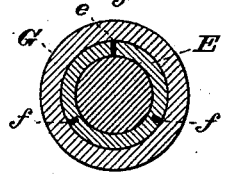

Figure 1 of the drawings is a representation of this invention, and is a side view, a small portion being in section. Fig. 2 is a detail and a perspective view. Fig. 3 is a section taken lengthwise of the mandrel. Fig. 4 is a cross-section taken where the broken line $x$ $x$ is marked on Fig. 3.

The invention relates to improvements in expansion mandrels; and it consists in the construction and novel combination of parts, as hereinafter set forth.

The object of the invention is to provide a mandrel that is easily adjusted to the work and that does not require the use of a hammer in placing it, thus preventing the marring of the parts.

Referring to the drawings, A designates the stem or shank portion, which may connect the two heads of the mandrel, as shown in the drawings; or the shank may be provided with one head and a center on its opposite end to be used in the lathe for small work. The head B is tapered or conical from the shoulder $a$ to the point $b$, and is preferably hardened and ground. The threaded portion C is adapted to engage the nut D, which forces the sleeve E on the tapered head, and the portion F, extending from the threaded portion, is provided with a center, $c$, in its end, and has a flattened side, $d$, for engagement by the dog. The sleeve E is accurately tapered and ground on its inner side to fit the taper of the head, and its outer side is of a uniform circumference throughout its length, designed to bear equally at all its points within the pipe or tube G. The sleeve E is split longitudinally, as at $e$, and equidistant longitudinal kerfs $f$ extend partially through the shell. By means of the kerfs and the split the sleeve expands uniformly throughout its length when forced upon the inclined head by turning the nut D, which has an annular projecting shoulder or washer, $g$, to bear against the end of the sleeve.

It will be observed that this mandrel is adapted to large or small work, and that the tube being operated upon may extend beyond the rear end of the sleeve, as at $h$, so that the end of the tube may be faced off. The sleeve is somewhat longer than the tapered head and extends over the threaded portion, so that the nut has sufficient play to expand the sleeve.

Having described my invention, what I claim is—

1. The combination of the shank, the tapered head having the extended threaded portion and the portion having the center and the flattened side, the nut, and the interiorly-tapered sleeve having the split and the kerfs, substantially as specified.

2. The combination of the shank, the longitudinally-tapered head having the threaded portion provided with a center and the flattened side, the nut having the annular washer thereon, and the interiorly-tapered sleeve having the split and the equidistant longitudinal kerfs, substantially as specified.

In testimony whereof I affix my signature in presence of two witnesses.

JOHN MASSETT.

Witnesses:
W. J. BARNUM,
E. H. GLASSER.